United States Patent
Marcus et al.

(10) Patent No.: US 8,387,883 B1
(45) Date of Patent: Mar. 5, 2013

(54) BAR CODE IMAGERS

(75) Inventors: Matthew S. Marcus, Plymouth, MN (US); Bernard S. Fritz, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/219,284

(22) Filed: Aug. 26, 2011

(51) Int. Cl.
*G06K 7/10* (2006.01)
*G02B 26/08* (2006.01)
*G02B 26/00* (2006.01)
*G02B 5/08* (2006.01)

(52) U.S. Cl. ......... 235/462.03; 235/462.01; 235/462.22; 235/462.32; 235/462.35; 235/462.42

(58) Field of Classification Search ............ 235/462.22, 235/462.01, 462.35, 462.42, 462.03
See application file for complete search history.

(56) References Cited

U.S. PATENT DOCUMENTS

| | | | | |
|---|---|---|---|---|
| 4,230,266 A * | 10/1980 | Juvinall | ......................... | 235/490 |
| 5,080,456 A * | 1/1992 | Katz et al. | .................. | 359/214.1 |
| 5,164,584 A * | 11/1992 | Wike et al. | ..................... | 250/216 |
| 5,315,095 A * | 5/1994 | Marom et al. | ........... | 235/462.22 |
| 5,331,143 A * | 7/1994 | Marom et al. | ........... | 235/462.38 |
| 5,438,187 A * | 8/1995 | Reddersen et al. | ...... | 235/462.22 |
| 5,565,668 A * | 10/1996 | Reddersen et al. | ...... | 235/462.22 |
| 5,717,194 A * | 2/1998 | Forbes et al. | ............ | 235/462.32 |
| 5,770,847 A * | 6/1998 | Olmstead | .................. | 235/462.35 |
| 6,034,379 A * | 3/2000 | Bunte et al. | ..................... | 250/566 |
| 6,056,198 A * | 5/2000 | Rudeen et al. | ........... | 235/462.24 |
| 6,073,851 A * | 6/2000 | Olmstead et al. | ........ | 235/462.45 |
| 6,249,008 B1 * | 6/2001 | Bunte et al. | .................... | 250/566 |
| 6,273,336 B1 * | 8/2001 | Rudeen et al. | ........... | 235/462.24 |
| 6,540,145 B2 * | 4/2003 | Gurevich et al. | ........ | 235/462.21 |
| 6,814,288 B2 * | 11/2004 | Gurevich et al. | ............ | 235/454 |
| 7,224,540 B2 * | 5/2007 | Olmstead et al. | ............ | 359/754 |
| 2001/0001473 A1 * | 5/2001 | Tsi et al. | .................. | 235/472.01 |
| 2002/0011520 A1 * | 1/2002 | Gurevich et al. | ........ | 235/462.21 |
| 2002/0125325 A1 * | 9/2002 | Plesko | ...................... | 235/462.49 |
| 2002/0148900 A1 * | 10/2002 | Gurevich et al. | ........ | 235/462.34 |
| 2004/0056096 A1 * | 3/2004 | Gurevich et al. | ............. | 235/454 |
| 2004/0251306 A1 * | 12/2004 | Matsui et al. | .................. | 235/454 |
| 2006/0016892 A1 * | 1/2006 | Vinogradov et al. | ......... | 235/454 |
| 2006/0144944 A1 * | 7/2006 | Vinogradov et al. | ......... | 235/454 |
| 2006/0180670 A1 * | 8/2006 | Acosta et al. | ............ | 235/462.31 |
| 2007/0063043 A1 * | 3/2007 | Heinrich | ...................... | 235/454 |
| 2008/0237351 A1 * | 10/2008 | Goren et al. | .................. | 235/470 |

* cited by examiner

*Primary Examiner* — Daniel Walsh
(74) *Attorney, Agent, or Firm* — Brooks, Cameron & Huebsch, PLLC

(57) ABSTRACT

Bar code imagers and methods of operating bar code imagers are described herein. One method includes selectively illuminating a portion of an axicon optical element of a bar code imager device, forming, by the axicon optical element in response to the selective illumination of the portion of the axicon optical element, an illumination beam, and illuminating a bar code with the illumination beam formed by the axicon optical element.

19 Claims, 1 Drawing Sheet

BAR CODE IMAGERS

TECHNICAL FIELD

The present disclosure relates to bar code imagers and methods of illumination used in such devices.

BACKGROUND

A bar code is a representation of data, such as, for instance, an optical machine-readable representation of data. For example, a bar code can represent data using a number of parallel lines and/or the spacing between the lines. Such a bar code can be referred to as a one-dimensional bar code.

As an additional example, a bar code can represent data using a number of geometrical shapes and or patterns, such as, for instance, squares, dots, and/or hexagons, among other geometrical shapes and/or patterns. Such a bar code can be referred to as a two-dimensional bar code.

A bar code can be used to represent data associated with a product or products, among other uses. For example, a bar code representing data associated with a product(s) can be placed on the product(s) (e.g., on the packaging of the product(s) or on the container containing the product(s)).

A bar code imager can be used to create an image of (e.g., read) a bar code. The bar code imager can create the image of the bar code by, for example, illuminating the bar code in the case of a low ambient light environment. The image of the bar code can then be used to determine (e.g., read) the data represented by the bar code.

Some previous bar code imagers may be able to create a high resolution image of a bar code that is located a long distance from the bar code imager. However, such previous long range, high resolution bar code imagers had large form factors (e.g., large physical sizes and/or dimensions). That is, such previous long range, high resolution bar code imagers were not compact bar code imagers, and therefore could not be readily positioned or moved to a proper imaging location.

DETAILED DESCRIPTION

Bar code imagers and methods of operating bar code imagers are described herein. For example, one or more embodiments include selectively illuminating a portion of an axicon optical element of a bar code imager device, forming, by the axicon optical element in response to the selective illumination of the portion of the axicon optical element, an illumination beam, and illuminating a bar code with the illumination beam formed by the axicon optical element.

Bar code imagers in accordance with one or more embodiments of the present disclosure can be long range, high resolution bar code imagers having reduced form factors (e.g., reduced physical sizes and/or dimensions) as compared to previous long range, high resolution bar code imagers. That is, bar code imagers in accordance with one or more embodiments of the present disclosure may be compact bar code imagers as compared to previous long range, high resolution bar code imagers.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of portions" can refer to one or more portions.

Figure 1:
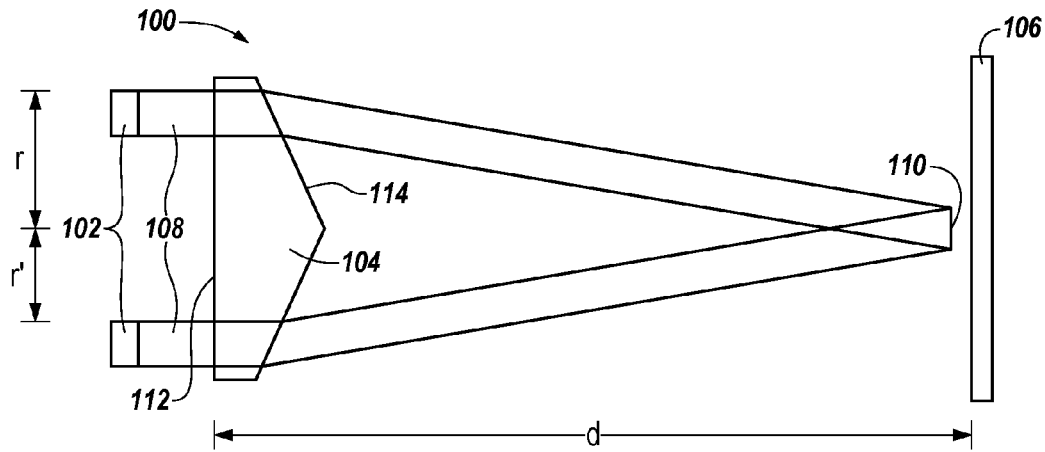
FIG. 1 illustrates a side view of a portion of a bar code imager in accordance with one or more embodiments of the present disclosure.

FIG. 1 illustrates a side view of a portion of a bar code imager 100 in accordance with one or more embodiments of the present disclosure. Bar code imager 100 can be used to create an image of a bar code such as, for instance, bar code 106 illustrated in FIG. 1. For example, bar code imager 100 can include the elements (e.g., illumination elements) illustrated in FIG. 1, as well as additional portions and/or elements not shown in FIG. 1 for clarity and so as not to obscure embodiments of the present disclosure (as will be understood by one of skill in the art), which can be used to create an image of bar code 106. Bar code 106 can be, for example, a one-dimensional or two-dimensional bar code.

Bar code imager 100 can be a long range and/or high resolution bar code imager. That is, bar code imager 100 can create an image of (e.g., read) a bar code (e.g., bar code 106) that is located a long distance from bar code imager 100, and/or bar code imager 100 can create a high resolution image of a bar code.

For example, bar code 106 can be located a distance d from bar code imager 100 (e.g., from axicon optical element 104 of bar code imager 100), as illustrated in FIG. 1, and distance d can be, for instance, at least 10 meters (e.g., 25 meters). As an additional example, bar code imager 100 can have a resolution of approximately 5 mils. As such, bar code imager 100 can have a reduced form factor (e.g., reduced physical size and/or dimensions) as compared to previous long range, high resolution bar code imagers, as previously described herein.

However, embodiments of the present disclosure are not limited to a particular distance between bar code imager 100 and bar code 106, or to a particular resolution for bar code imager 100. For example, bar code imager 100 may also be used for short range applications (e.g., to create an image of a bar code that is located a short distance from bar code imager 100).

As shown in FIG. 1, bar code imager 100 includes an illumination source 102 and an axicon optical element 104. For clarity and so as not to obscure embodiments of the present disclosure, a portion of illumination source 102 is shown in FIG. 1 (e.g., illumination source 102 can include additional portions and/or elements not shown in FIG. 1).

Illumination source 102 can be, for example, an annular (e.g., ring-shaped) illumination source having an outer radius (e.g., the radius of the outer circle of the annular illumination source) r and an inner radius (e.g., the radius of the inner circle of the annular illumination source) r', as illustrated in FIG. 1. For instance, illumination source 102 can include an annular aperture (e.g., opening) through which light (e.g., light 108) can pass, or any other suitable light source structure.

Axicon optical element 104 can be, for example, an axicon lens. That is, axicon optical element 104 can be a lens having a base surface (e.g., side) 112 and a conical (e.g., cone-shaped) surface (e.g., side) 114, as illustrated in FIG. 1.

Illumination source 102 can selectively illuminate (e.g., with light 108) a portion (e.g., not all) of axicon optical element 104 (e.g., base surface 112 of axicon optical element 104), as illustrated in FIG. 1. For example, illumination source 102 can selectively illuminate (e.g., with light 108) an annular (e.g., ring-shaped) portion of axicon optical element 104, as illustrated in FIG. 1. That is, illumination source 102 can illuminate axicon optical element 104 such that only an annular portion of axicon optical element 104 is illuminated (e.g., such that the remainder of axicon optical element 104 is not illuminated while the annular portion of axicon optical element 104 is illuminated), as illustrated in FIG. 1.

In response to (e.g., as a result of) the selective illumination of the portion of axicon optical element 104, axicon optical element 104 can form (e.g., create and/or generate) an illumination beam 110 for illuminating bar code 106 (e.g., a portion of bar code 106), as illustrated in FIG. 1. Different portions (e.g., different lateral portions) of bar code 106 can be illuminated by illumination beam 110 by, for example, adjusting (e.g., changing) the orientation of an axis (e.g., the optical axis) associated with axicon optical element 104.

Illumination beam 110 can be, for example, a beam of light that illuminates bar code 104. Illumination beam 110 can be formed, for example, by converging the light passing through axicon optical element 104 in response to the illumination of axicon optical element 104 (e.g., light 108) into illumination beam 110 at distance d (e.g., at a point that is distance d from bar code imager 100), as illustrated in FIG. 1.

As shown in FIG. 1, illumination beam 110 can be circular based on the illumination using an annular (e.g., ring-shaped) illumination source or multiple illumination sources in a ring-shaped configuration. That is, illumination beam 110 can be a circular illumination beam that illuminates a circular portion of bar code 106.

In embodiments in which illumination beam 110 is circular, the diameter of illumination beam 110 at distance d can be, for example, approximately 125 micrometers. However, embodiments of the present disclosure are not limited to a particular diameter or shape for illumination beam 110.

In some embodiments, the distance d at which bar code 106 is located from bar code imager 100 (e.g., the distance d at which light 108 converges to form illumination beam 110) can correspond to (e.g., depend on) the portion of axicon optical element 104 that is selectively illuminated. That is, selectively illuminating different portions of axicon optical element 104 (e.g., at different times) can form different illumination beams at different distances for illuminating bar codes located at different distances from bar code imager 100.

As an example, illumination source 102 can selectively illuminate (e.g., at different times) a number of different annular portions of axicon optical element 104. Each different illuminated annular portion of axicon optical element 104 may have a different radius (e.g., a different radius r of the outer circle of the annular portion and/or a different radius r' of the inner circle of the annular portion). That is, illumination source 102 can have a number of different radii (e.g., a number of different radii r and r'), and can selectively illuminate an annular portion of axicon optical element 104 while at each different radius.

In response to the selective illumination of the different annular portions of axicon optical element 104, axicon optical element 104 can form an illumination beam (e.g., illumination beam 110) for illuminating bar codes (e.g., bar code 106) located at a number of different distances (e.g., distance d) from bar code imager 100. Each different distance can correspond to a different illuminated annular portion of axicon optical element 104. For example, the distance of bar code from bar code imager 100 can increase as the radius of the illuminated annular portion of axicon optical element 104 increases (e.g., as the radius of illumination source 102 increases). Additionally, in some embodiments, the distance between illumination source 102 and axicon optical element 104 can be adjusted to change the intensity and/or radius of the illumination of axicon optical element 104.

Figure 2:
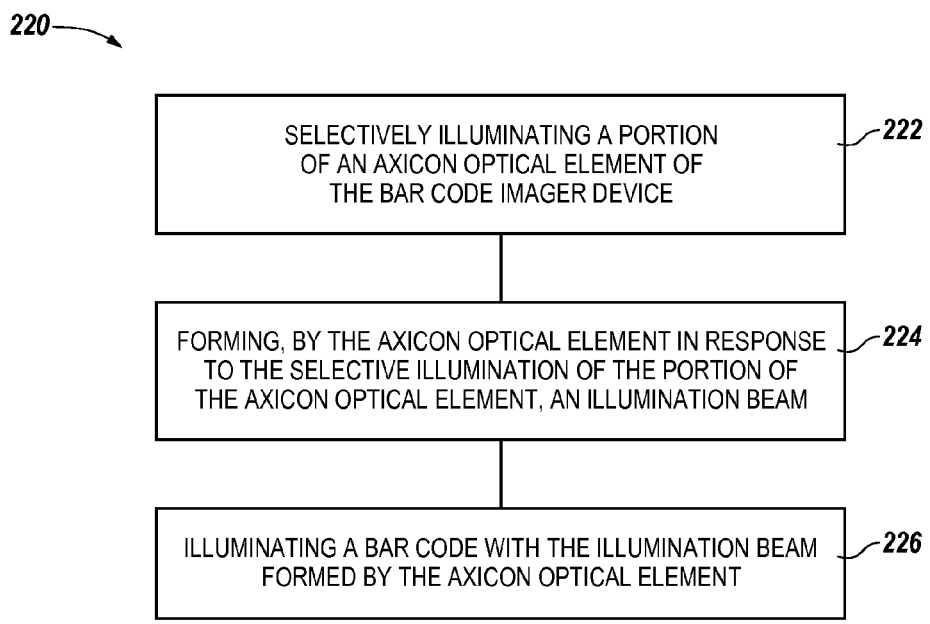
FIG. 2 illustrates a method of operating a bar code imager in accordance with one or more embodiments of the present disclosure.

FIG. 2 illustrates a method 220 of operating a bar code imager in accordance with one or more embodiments of the present disclosure. The bar code imager can be, for example, bar code imager 100 previously described in connection with FIG. 1.

At block 222, method 220 includes selectively illuminating a portion of an axicon optical element of the bar code imager device (e.g., bar code imager 100). The axicon optical element can be, for example, axicon optical element 104 previously described in connection with FIG. 1, and the portion of the axicon optical element can be selectively illuminated in a manner analogous to that previously described in connection with FIG. 1.

At block 224, method 220 includes forming, by the axicon optical element in response to the selective illumination of the portion of the axicon optical element, an illumination beam. The illumination beam can be, for example, illumination beam 110 previously described in connection with FIG. 1, and can be formed by the axicon optical element in a manner analogous to that previously described in connection with FIG. 1.

At block 226, method 220 includes illuminating a bar code with the illumination beam formed by the axicon optical element. The bar code can be, for example, bar code 106 previously described in connection with FIG. 1, and can be illuminated in a manner analogous to that previously described in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of decoding bar codes using a bar code imager device, comprising:
   selectively illuminating, by an annular illumination source, only an annular portion of an axicon optical element of the bar code imager device;
   forming, by the axicon optical element in response to the selective illumination of only the annular portion of the axicon optical element, a circular illumination beam;
   illuminating a circular portion of a bar code with the circular illumination beam formed by the axicon optical element; and
   decoding the barcode using the circular illumination.

2. The method of claim 1, wherein:
   the bar code is located a particular distance from the bar code imager device; and
   the particular distance corresponds to the annular portion of the axicon optical element of the bar code imager device that is selectively illuminated.

3. The method of claim 1, wherein:
   illuminating the bar code with the illumination beam formed by the axicon optical element includes illuminating a first portion of the bar code with the illumination beam; and
   the method includes illuminating a second portion of the bar code with the illumination beam by adjusting an orientation of an axis associated with the axicon optical element.

4. The method of claim 1, wherein selectively illuminating only an annular portion of the axicon optical element includes selectively illuminating only an annular portion of a surface of the axicon optical element.

5. The method of claim 1, wherein the illumination beam is a circular illumination beam that illuminates a circular portion of the bar code.

6. A method of decoding bar codes using a bar code imager device, comprising:
   illuminating, by an annular illumination source, an axicon optical element of the bar code imager device such that only an annular portion of the axicon optical element is illuminated;
   forming, by the axicon optical element in response to the illumination of the axicon optical element, a circular illumination beam;
   illuminating a circular portion of a bar code with the circular illumination beam formed by the axicon optical element; and
   decoding the bar code using the circular illumination.

7. The method of claim 6, wherein illuminating the axicon optical element such that only an annular portion of the axicon optical element is illuminated includes illuminating the axicon optical element such that the remainder of the axicon optical element is not illuminated while the annular portion of the axicon optical element is illuminated.

8. The method of claim 6, wherein forming the illumination beam includes converging light passing through the axicon optical element in response to the illumination of the axicon optical element into a circular illumination beam that illuminates a circular portion of the bar code.

9. The method of claim 6, wherein the bar code is located at least 10 meters from the bar code imager device.

10. The method of claim 9, wherein the bar code is located approximately 25 meters from the bar code imager device.

11. A bar code imager device, comprising:
    an axicon optical element; and
    an annular illumination source;
    wherein:
    the annular illumination source is configured to selectively illuminate only an annular portion of the axicon optical element;
    the axicon optical element is configured to form a circular illumination beam configured to illuminate a circular portion of a bar code in response to the selective circular illumination of only the annular portion of the axicon optical element; and
    the device is operable to decode the bar code using the circular illumination.

12. The device of claim 11, wherein:
    the annular illumination source is configured to selectively illuminate only a number of different annular portions of the axicon optical element; and
    the axicon optical element is configured to form an illumination beam for illuminating a bar code located at a number of different distances from the bar code imager device, wherein each different distance from the bar code imager device corresponds to a different illuminated annular portion of the axicon optical element.

13. The device of claim 12, wherein each different illuminated annular portion of the axicon optical element has a different radius.

14. The device of claim 13, wherein the distance of the bar code from the bar code imager device increases as the radius of the illuminated annular portion of the axicon optical element increases.

15. The device of claim 11, wherein the axicon optical element is an axicon lens.

16. The device of claim 11, wherein the axicon optical element includes a conical surface and a base surface.

17. The device of claim 16, wherein the annular illumination source is configured to selectively illuminate only an annular portion of the base surface.

18. The device of claim 11, wherein the bar code imager device has a resolution of approximately 5 mils.

19. The device of claim 11, wherein the annular illumination source includes an annular aperture.

* * * * *